INVENTORS
FRANK CARTLIDGE
JOSEPH GONSKI
BY
Murray A. Gleeson
THEIR ATTORNEY

INVENTORS
FRANK CARTLIDGE
JOSEPH GONSKI
BY
Murray G. Gleeson
THEIR ATTORNEY

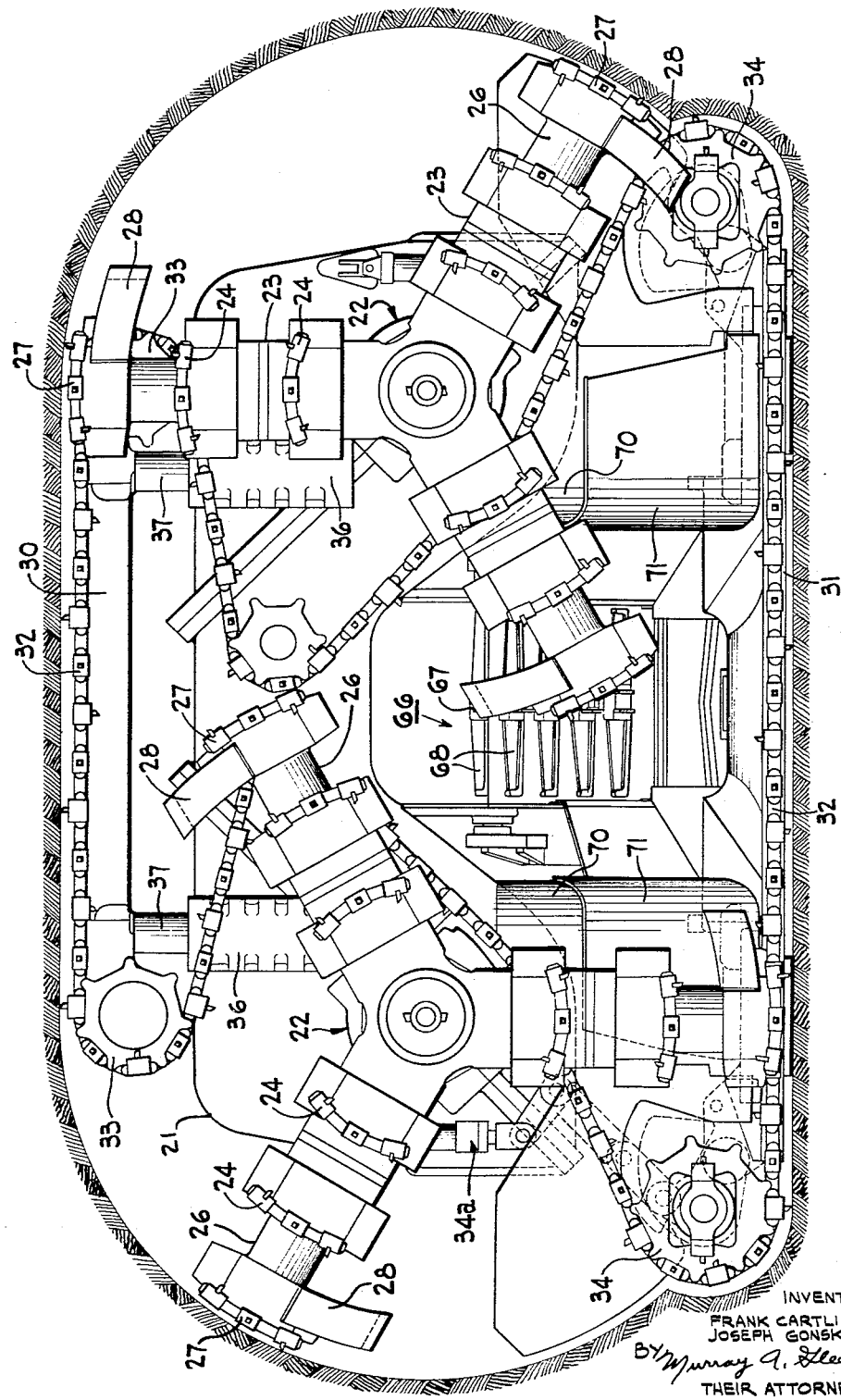

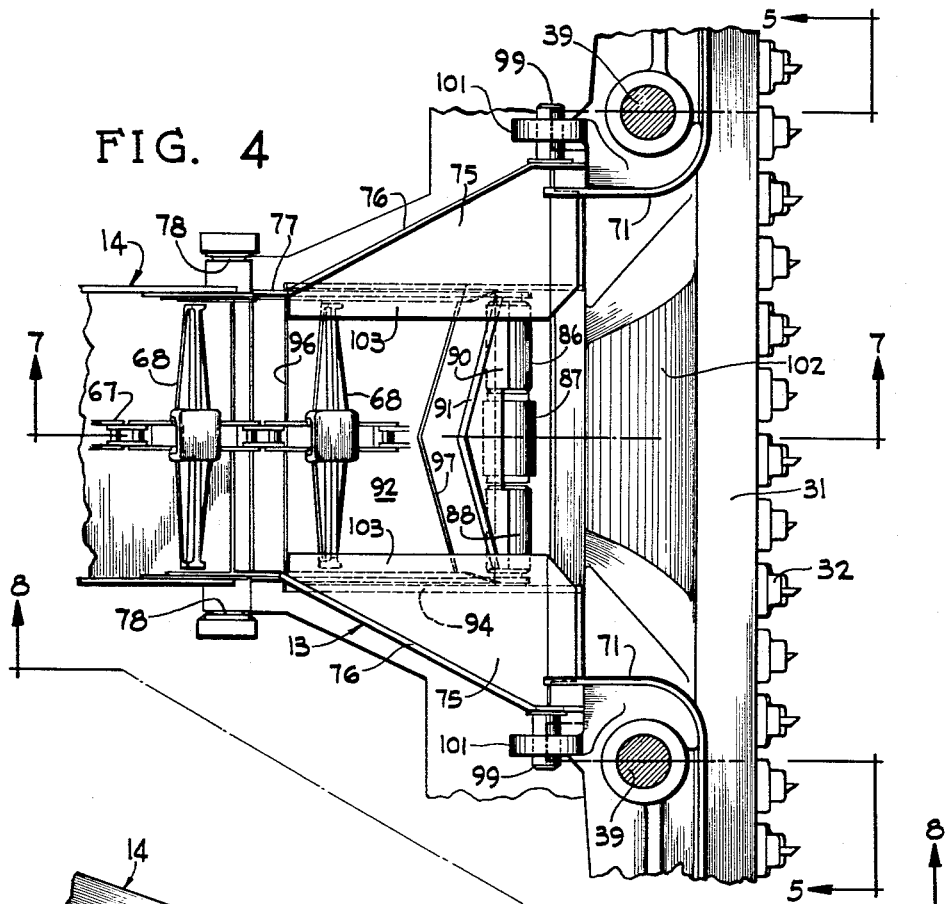
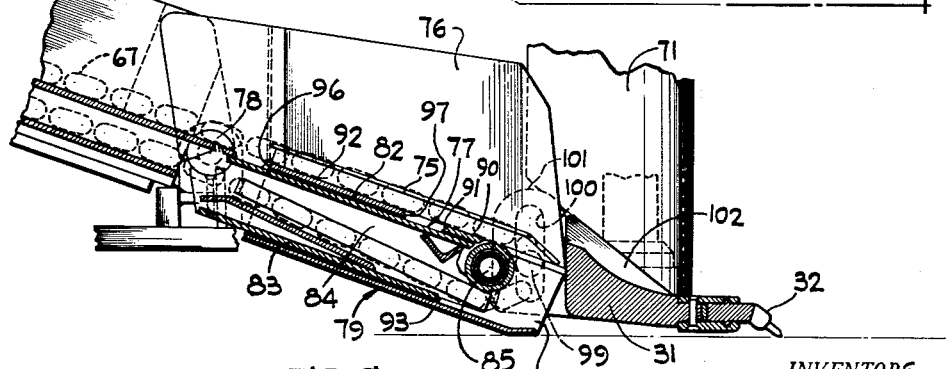

INVENTORS
FRANK CARTLIDGE
JOSEPH GONSKI
BY
Murray A. Gleeson
THEIR ATTORNEY

INVENTORS
FRANK CARTLIDGE
JOSEPH GONSKI
BY
Murray G. Gleeson
THEIR ATTORNEY

United States Patent Office 2,715,527

Patented Aug. 16, 1955

2,715,527

MINING MACHINES WITH FLEXIBLE CONNECTION BETWEEN CUTTER BAR AND CONVEYOR

Frank Cartlidge and Joseph Gonski, Chicago, Ill., assignors to Goodman Manufacturing Company, Chicago, Ill., a corporation of Illinois Application November 12, 1953, Serial No. 391,419

5 Claims. (Cl. 262—29)

This invention relates to improvements in mining machines of the multiple boring type adapted to cut contiguous bores in advance of the machine. Such machines, commonly known as McKinlay type miners, have a main cutting frame including a pair of laterally spaced boring heads rotating on axes perpendicular to the working face, and auxiliary horizontally disposed upper and lower cutter bars disposed immediately behind the boring heads for trimming the circular bore pattern to produce flat roof and floor surfaces.

One of the principal objects of the present invention is to provide a machine of the type above mentioned wherein the main cutting frame is readily adjustable for vertical or lateral tilting angles with respect to the mobile base frame to increase the flexibility and maneuverability of the machine in mining operations.

A further object is to provide an improved and simplified structure including an adjustable cutter frame but wherein the discharge conveyor, on which the material is disposed from the cutter frame, has its main support no the mobile base frame but means are provided for flexibly supporting the front end of the conveyor on the cutter frame to accommodate variations in adjustment of the latter.

A still further object of the invention is to provide a machine of the type above mentioned wherein the lower cutter bar is vertically adjustable on the cutter frame and flexible connections are provided between the front end of the discharge conveyor and the vertically adjustable cutter bar to accommodate said conveyor both to lateral tilting movements of the cutter frame and vertical movements of the lower cutter bar.

Other objects of the invention will appear from time to time as the following description proceeds.

The invention may best be understood by reference to the accompanying drawings, in which:

Figure 3 is a front view of the machine shown in Figure 1;

Figure 4 is a detail fragmentary plan view showing the central portion of the lower cutter bar and the front portion of the discharge conveyor;

Figure 7 is a detail section taken generally on line 7—7 of Figure 4, but with the conveyor chain shown in dotted lines and with the lower cutter bar in downwardly extended position adjacent the mine floor;

Figure 1:
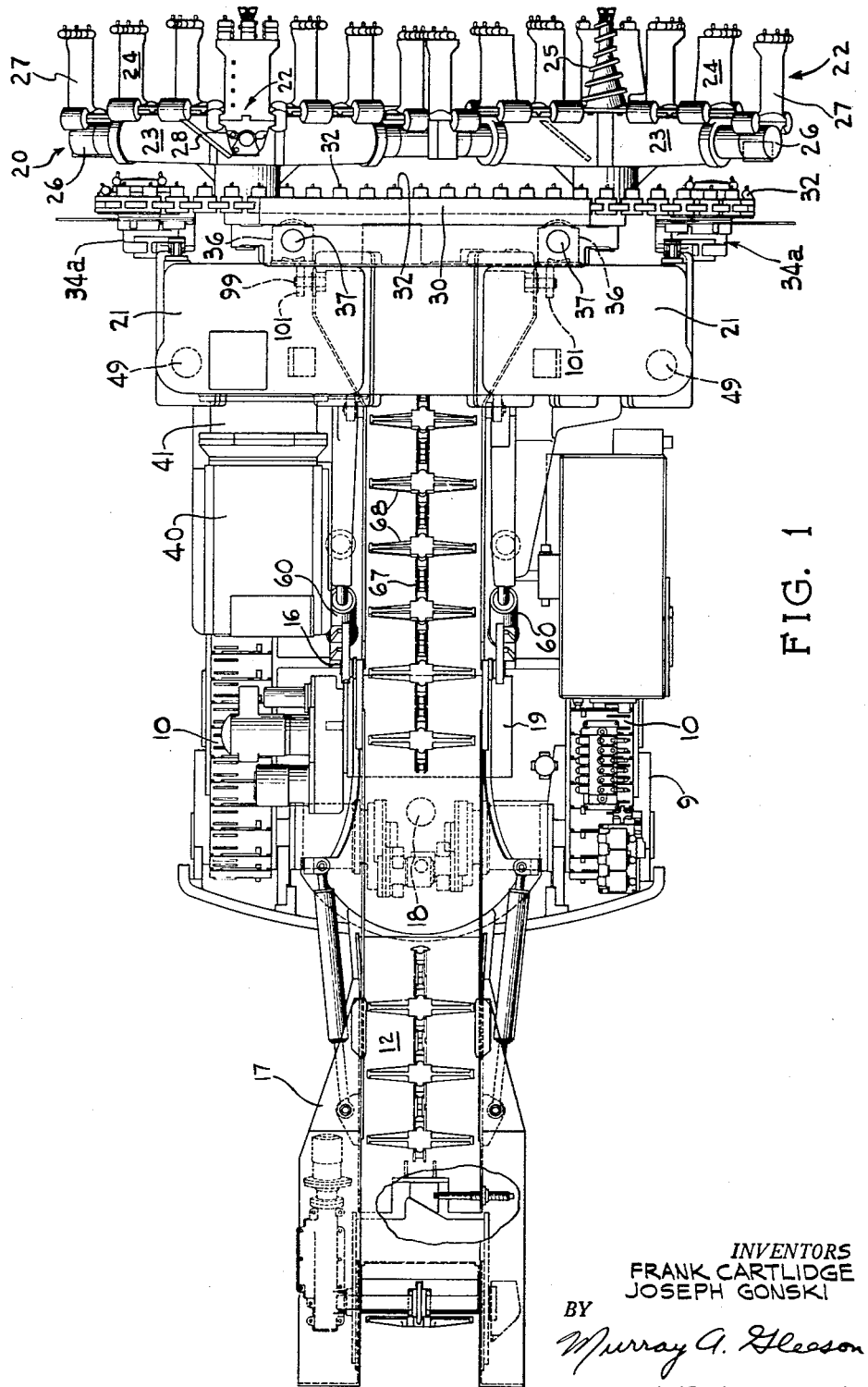
Figure 1 is a plan view of a mining machine made in accordance with the present invention.

Referring now to details of the embodiment of the invention shown in the drawings, a mobile base frame, indicated generally at 9, is mounted on parallel endless treads 10, 10. Said base frame has a relatively low-slung cross member 11 between the endless treads. A centrally disposed endless conveyor, indicated generally at 12, extends longitudinally of the main frame. As shown herein, said conveyor consists essentially of four sections; namely, an adjustable front section 13 connected to the front end of an upwardly and rearwardly inclined section 14 fixed to the main frame, a vertically swingable section 15 pivoted to the fixed section 14 on a transverse axis 16 and a laterally swingable discharge section 17 pivotally connected to the swingable section 15 on a pivot 18. The conveyor 12 may be of conventional center chain type excepting as to the construction and arrangement of the adjustable front section 13 which affords a flexible and extensible connection between the upwardly inclined conveyor section 14 and the main cutter head of the machine in a novel manner, as will hereafter be more fully described.

The base frame 9 carries a motor 19 for driving the endless treads, together with suitable drive connections and control devices for operating the endless treads in unison or at different speeds or in opposite directions for maneuvering the machine as usual on the mine floor. Details of the drive connections and control devices need not be described as they form no part of the present invention.

A cutter frame, indicated generally at 20, includes a relatively large upright subframe 21 extending approximately the full width of the base frame across the front end of the latter, which subframe forms the main support for the cutting devices of the machine.

The main cutting devices on the cutter frame 20 consist of a pair of forwardly projecting boring heads 22, 22 each having a plurality (herein three in number) of radial arms 23, 23. The boring heads 22 are fixed on parallel shafts journalled in suitable bearings in the subframe 21, with the radial arms 23, 23 of the two boring heads arranged for rotation in substantially the same vertical plane well in advance of the subframe 21. As usual, cross drive connections are provided for rotating the two boring heads in synchronism so that their arms do not interfere with each other. Each of the radial arms has forwardly projecting cutter supports 24 thereon for dislodging material from the working face. The two boring heads may also have a tapered screw member 25 projecting forwardly from the front end of its respective main shaft as usual.

Each of the radial arms 23 also has a telescopically extensible and retractable end portion 26 having a forwardly projecting cutter support 27 thereon so as to permit variation in the diameter of the cutter heads as desired.

Suitable means may be provided for effecting endwise adjustment of the telescopic end portions 26 of the radial arms, as for instance the mechanism for this purpose disclosed in the copending application of Frank Cartlidge bearing Serial Number 376,652, filed August 26, 1953, owned by the assignee of the present invention. Deflecting plates or scoops 28 are also mounted as usual on one side of each end portion 26 of the radial arms to direct loose material toward the center of the machine for collection by the discharge conveyor, as will presently appear. Other details of the boring heads 22 need not be described herein as they form no part of the present invention.

Two vertically spaced horizontally disposed cutter bars 30 and 31 are mounted along the top and bottom edges, respectively, of the subframe 21 immediately to the rear of the radial arms 23 to form guides for an endless cutter chain 32 for removing the depending and upstanding cusps left by the two boring heads, thus trimming the circular bore pattern to produce flat roof and floor surfaces as the machine is advanced into the working face. The cutter chain 32 is trained over idler sprockets 33, 33 rotatably mounted on the outer ends of the upper cutter bar 30 and over other idler sprockets 34, 34 disposed at the outer ends of the lower cutter bar 31.

Both the upper and lower cutter bars 30 and 31 are provided with means for adjustment vertically of the subframe 21. In the form shown, the adjustment means for the upper cutter bar consists of a pair of hydraulic cylinders 36, 36 mounted at the front of the subframe 21 and having piston rods 37, 37 connected to opposite ends of the upper cutter bar 30. Similarly the lower cutter bar 31 is vertically adjustable by means of a pair of hydraulic cylinders 38, 38 on subframe 21 and having piston rods 39, 39 fixed to said cutter bar (see Figure 5).

The idler sprockets 34, 34 may have mechanism, indicated generally at 34a, for automatic inward and upward retraction when the lower cutter bar 31 is raised. As shown herein, the mechanism for this purpose is similar to that shown and described in the copending application of Nolan E. Evans, Emil J. Hlinsky and Charles T. Ogden, bearing Serial Number 394,706, filed November 27, 1953, owned by the assignee of the present invention. Means are also provided as usual for driving and tensioning the cutter chain 32 in the various positions of adjustment of the cutter bars. Further details of such means need not be shown and described as they form no part of the present invention.

From the above description, it will now be understood that the diameter of the two boring heads 22 can be varied by extending or retracting the telescoping end portions 26 of the radial boring arms simultaneously while the upper and lower cutter bars 30 and 31 can also be adjusted vertically to trim the roof and floor surfaces to correspond substantially with the diameter of the boring heads. Retraction of the telescoping end sections of the radial arms and the corresponding retraction of the upper and lower cutter bars facilitate withdrawal of the machine as a whole from the working face when desired.

Power means for driving the several cutting devices on the cutter frame 20 is preferably mounted directly on and movable with said cutter frame. In the form shown herein, said power means consists of a single motor 40 connected by a suitable overload release clutch to the rear face of the upright subframe 21 (containing suitable gear reduction mechanisms) adjacent one side thereof, as shown in Figure 1. Drive connections and control devices for operating both the rotating boring heads 22 and the drive sprocket for the cutter chain 32 are enclosed within the subframe or gear housing 21 and need not be more fully shown nor described herein as such drive means are well known in the art and form no part of the present invention.

Figure 2:
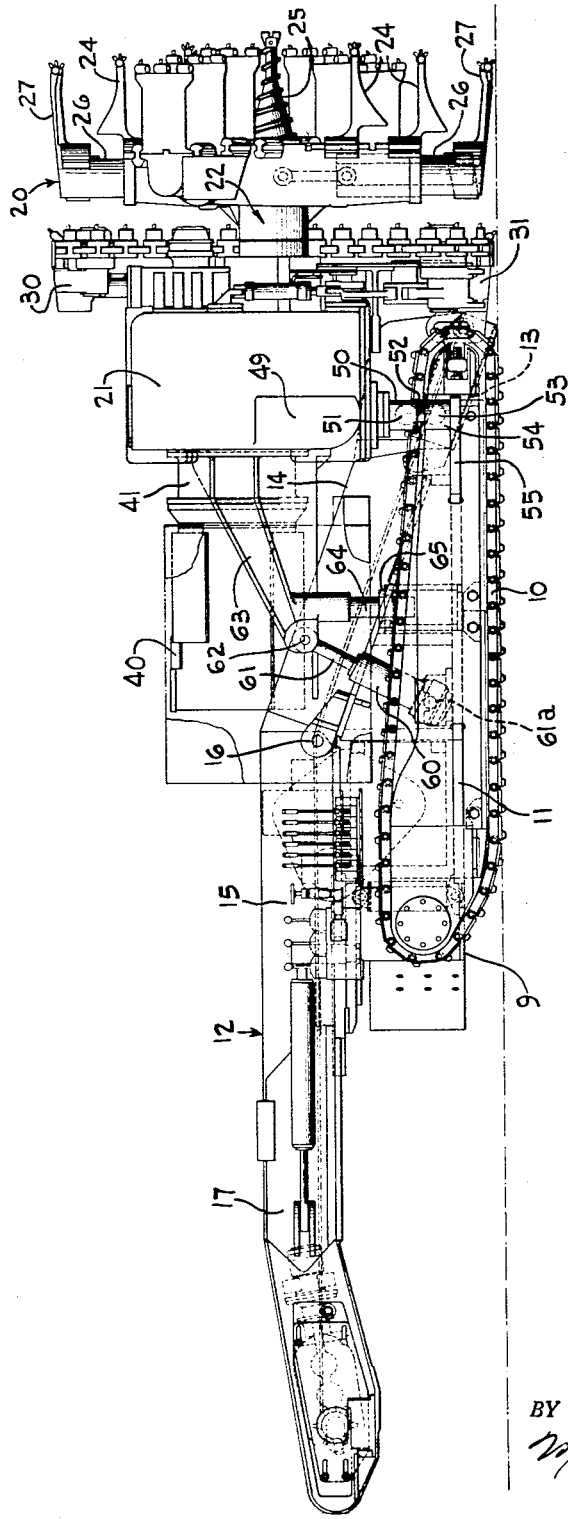
Figure 2 is a side view of the machine shown in Figure 1.

The entire cutter frame 20 is adjustable for limited forward and rearward tilting movement with respect to the base frame by the following means:

Referring to Figures 1 and 2, the subframe or gear housing 21 of the cutter frame is disposed generally above the front ends of the endless treads 10 and is provided with a pair of vertically disposed hydraulic jacks 49, 49 located adjacent its opposite rear corners. Said jacks have downwardly extending piston rods 50, 50, each having a ball-and-socket connection 51 with the upper end of a short connecting rod 52, the lower end of which has a similar ball-and-socket connection 53 with a pedestal 54 fixed on a laterally extending support 55 formed integrally with the base frame cross member 11 and projecting outwardly therefrom between the upper and lower reaches of the endless treads 10. This is shown and described in more detail in the copending application of Frank Cartlidge, Serial Number 398,958, filed December 18, 1953, owned by the assignee of the present invention. Either hydraulic jack 49 can be extended or retracted individually to cause lateral tilting of the main cutter frame 20.

Limited forward and rearward tilting adjustment of the cutter frame 20 is effected by a pair of hydraulic jacks 60, 60 having their lower ends pivotally connected at 61a to the cross member 11 of the base frame 9 toward the rear end of the latter and on opposite sides of the conveyor 12. The hydraulic jacks 60 are normally inclined at a forwardly and upwardly extending angle, with their piston rods 61 pivoted at 62 to rearwardly and downwardly extending arms 63 fixed to the rear face of the subframe 21 of the cutter frame 20. As shown in the above-mentioned Cartlidge application Serial 398,958, each of the arms 63 also has a depending stabilizing rod 64 fixed near its rear end with the lower end of said rod projecting into an open socket in an upstanding annular support 65. The stabilizing rods 64 are loosely mounted in their respective sockets so as to restrain the cutter frame from lateral displacement relative to the main frame during operation of the machine.

It will be understood that lateral and vertical tilting adjustments of the cutter frame can be effected independently of, or in conjunction with, each other by selective control of the hydraulic jacks 49, 49 and 60, 60 respectively, each supplied by hydraulic pressure from a suitable source of supply, under control of conventional valve means which need not be more fully shown nor described herein.

Figure 5:
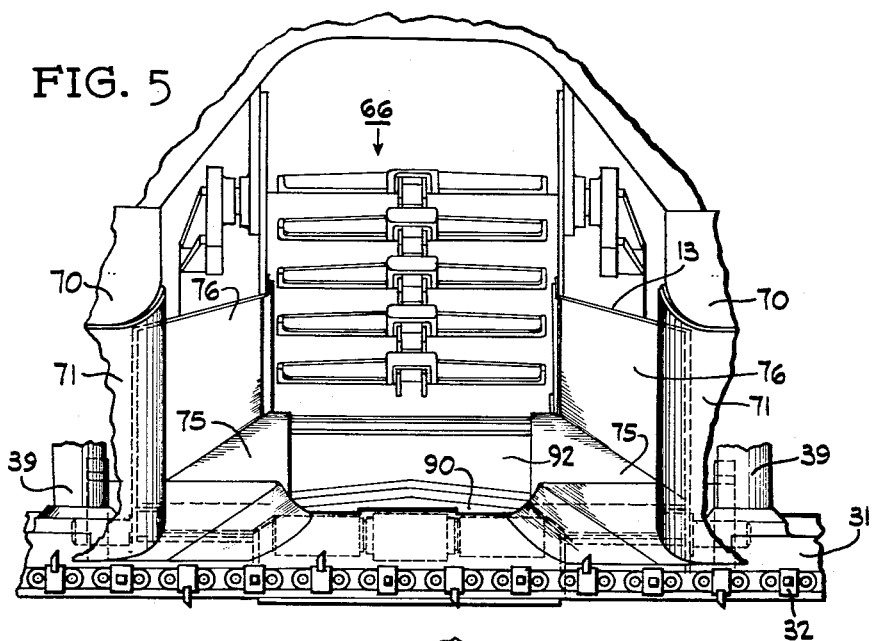
Figure 5 is a fragmentary detail view taken generally from the front end of the machine on line 5—5 of Figure 4, but with the boring heads removed to show the relationship between the lower cutter bar and the discharge conveyor when the cutter bar is in a downwardly extended horizontal position.
Figure 6:
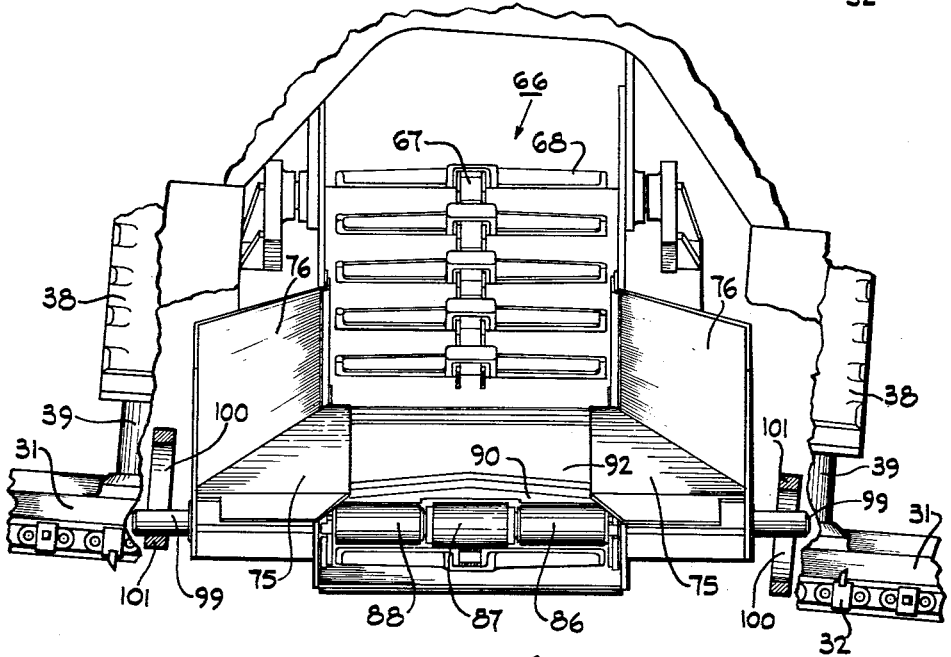
Figure 6 is a view somewhat similar to Figure 5, but with parts broken away to show the flexible connections between the front end of the discharge conveyor and the lower cutter bar when said bar is in laterally tilted position.

Referring now more particularly to the means for transferring material dislodged by the cutting devices of the cutter frame to the conveyor 12 for discharge at the rear end of the machine, it will be observed from Figures 3, 4 and 5 that the conveyor as a whole is disposed centrally of the machine and that the cutter frame 20 has an enlarged opening or throat, indicated generally at 66 in Figures 3, 5 and 6, through which the material dislodged by the cutting devices passes to the front end of the conveyor 12. The conveyor is of the conventional endless chain flight type, including a central chain 67 and transverse flights 68.

The sides of throat 66 are defined by a pair of laterally spaced upright pusher plates 70, 70 fixed to the cutter frame and curving outwardly along the front of said frame. A pair of overlapping pusher plates 71, 71 are carried on the lower cutter bar 31 and move in telescopic relation with the fixed plates 70 when said cutter bar is raised or lowered.

In the preferred form shown herein, the throat 66 is somewhat wider than the discharge conveyor 12, excepting that the front section 13 of said conveyor has a pair of forwardly flared aprons 75, 75 along opposite sides of the chain conveyor, and with upright side walls 76, 76 having their front ends spanning slightly more than the full width of the throat 66, as shown in Figure 4.

The front conveyor section 13 affords a flexible connection between the movable lower cutter bar 31 and the relatively fixed conveyor section 14 carried on the main frame 9, in the following manner:

The front conveyor section consists essentially of an inner box portion 77 hinged at its rear end to the forward end of conveyor section 14 about pivot members 78, 78 and having its forward end telescopically adjustable along and within a hollow trough portion 79 which also has the flared aprons 75, 75 and the diverging upright side walls 76, 76 formed integrally therewith. As seen in Figure 7, the inner box portion 77 has an upper plate 82 and a parallel lower plate 83 connected by side walls 84. The upper plate 82 projects forwardly slightly beyond the lower plate 83 and has a horizontal cross shaft 85 at its front end which supports one or more turnabout bearing rollers 86, 87, 88 (herein three), for the conveyor chain 67 and its flights 68. In the form shown herein, the central bearing roller 87 is of slightly greater diameter than the side rollers. A relatively narrow filler strip 90 is fixed to the top surface of the upper plate 82 of the inner box section, immediately to the rear of, and substantially tangential to, the upper peripheries of the three bearing rollers. As seen in Figure 4, the rear edge 91 of said filler strip 90 preferably terminates in a wide rearwardly extending dihedral angle.

The hollow trough portion 79, forming the front end of the hinged conveyor section 13, includes a top plate 92 and a bottom plate 93 and side walls 94, 94 within which the inner box portion 77 is telescopically mounted. The top plate 92 extends only a portion of the length of the inner box portion, with its rear edge 96 terminating in spaced relation from the hinged axis of said box portion, and its front edge 97 terminating in a wide dihedral angle corresponding with, but spaced from, the rear edge 91 of the filler plate 90 on said box portion, so as to permit telescoping adjustment of said box portion relative to the trough portion 79.

The flared front end of the trough portion has a flexible connection to the lower cutter bar 31 to permit freedom of lateral, forward and rearward tilting adjustment of the cutter frame relative to the main frame 9 on which the adjoining conveyor section 14 is mounted, and also to permit freedom of vertical adjustment of the lower cutter bar relative to the cutter frame. In the form shown herein, said flexible connection consists of a pair of pivot pins 99, 99 projecting from opposite sides of the flared side walls 76 of the front trough section 13, and loosely mounted in vertically elongated slots 100, 100 in upright ears 101, 101 fixed on the rear of the lower cutter bar.

The upper surface of the cutter bar 31 is preferably cut away at the center of the latter to form a rearwardly and upwardly converging dished area 102 for facilitating the movement of cuttings from the mine floor onto the front section 13 of the discharge conveyor.

As seen in Figures 4 and 7, the inner margins 103, 103 of the flared aprons 75 along opposite sides of the front hollow trough portion 79 are disposed in spaced relation above the top plates 82 and 92 of the telescoping inner box and hollow trough portions of front conveyor section 13, so as to form hold-down guides for the ends of the conveyor flights 68 in all positions of adjustment of said front section.

The use and operation are as follows:

The main cutter frame 20, under most conditions, is advanced into the working face in a plane generally perpendicular to the mine floor on which the tractor treads of the main frame rests. The top and bottom cutter bars are normally disposed parallel with the roof and floor surfaces previously cut by the machine, excepting in instances where the cutter frame tends to "spiral" or cut higher at one side than the other. In such cases, this tendency is corrected by tilting the cutter frame laterally in the proper direction by one of the jacks 49, 49 to restore the head to level cutting position.

When it is desired to change the direction of cutting either upwardly or downwardly, either to follow weaving bottom or to correct a tendency to climb or dip, the cutter frame is tilted either rearwardly or forwardly by the jacks 60, 60, as needed.

Figure 8:
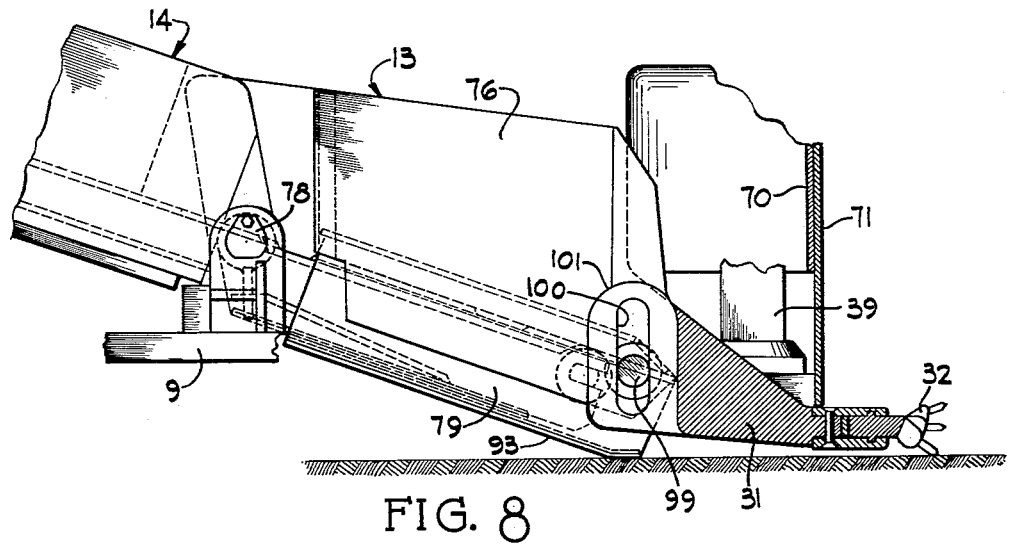
Figure 8 is a detail section taken on line 8—8 of Figure 4, with the lower cutter bar in the same downwardly extended position adjacent the ground, as shown in Figure 7.

The upper and lower cutter bars 30 and 31 are normally disposed, during cutting, so as to cut horizontal kerfs substantially tangential to the two bores cut by the boring heads 22. Accordingly, the lower cutter bar 31 is normally extended relative to the cutter frame to cut at the desired floor level, as shown in Figures 7 and 8. In this normal cutting position, the front edge of the bottom plate 93 of the hollow trough portion 79 is permitted to rest on the floor immediately to the rear of the bottom cutter bar, the upright slots 100, 100, into which the pivot pins 99, 99 at opposite sides of said conveyor section extend, being of sufficient length to afford freedom of vertical movement of said pins therein. Thus, the forward end of conveyor section 13, the rear end of which is hinged at 78, is normally supported on the mine floor, with what may be termed a flexible floating connection to the lower cutter bar 31.

Figure 9:
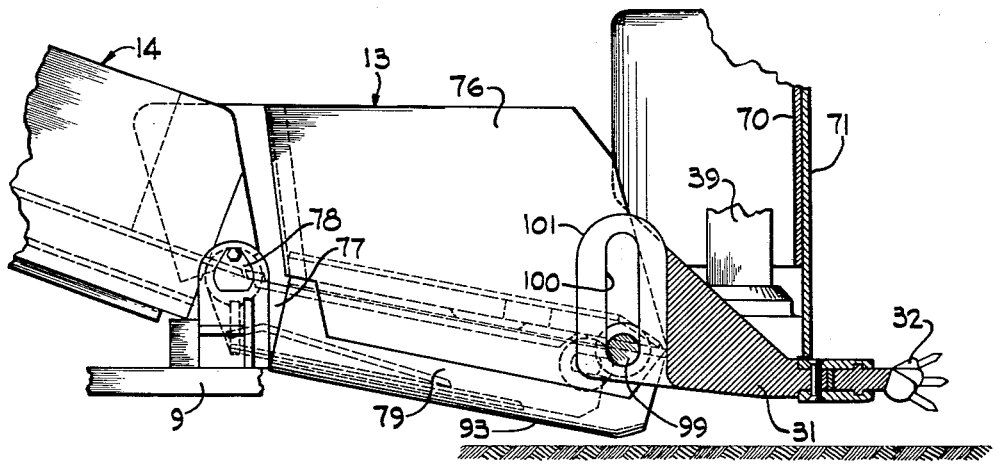
Figure 9 is a detail section similar to Figure 8, excepting that the lower cutter bar is in elevated position relative to the mine floor, while the adjustable front section of the discharge conveyor is in partially elevated position relative to the floor.

When the bottom cutter bar 31 is fully elevated, as shown in Figure 9 as for instance, for the purpose of withdrawal of the cutter frame from the face, or for tramming the entire machine from place to place in the mine, the pivot pins 99, 99 reach their upper limit of movement in slots 100, 100 so that the front end of the conveyor section 13 will then be raised into suspended position above the mine floor, as shown.

It will be further noted from Figure 6 that the floating connection, provided by pins 99, 99 and upright slots 100, 100 just referred to, also permits freedom of lateral adjustment of the cutter frame and the lower cutter bar relative to the front conveyor section 13, while maintaining the latter in material-receiving relation to the bottom cutter bar in all permissible positions of lateral tilting adjustment.

It will be further understood that the longitudinally telescoping movement of the front and rear portions of the front conveyor section 13 affords freedom of forward and rearward tilting adjustments of the cutter frame, as well as such minor readjustments in effective length of the front conveyor section, as may be required during vertical adjustment of the bottom cutter bar relative to the main cutter frame.

We claim:

1. In a mining machine, a main frame, a cutting frame mounted on the forward end of said frame, said cutting frame including a horizontally disposed cutter bar, means affording lateral and vertical tilting adjustments of said cutter bar relative to said main frame, a conveyor on said main frame for discharging cuttings from said cutting frame, including a trough section fixed on said main frame rearwardly of said cutter bar, an auxiliary trough section forming a continuation of said first-named trough section having its rear end pivotally connected to said first-named trough section on a transverse axis, two intermediate portions of said auxiliary through section being telescopically adjustable relative to each other, and means flexibly connecting the front end of said auxiliary trough section to said cutter bar to maintain the latter in material-receiving relation to said cutter bar in all permissible positions of adjustment thereof.

2. The structure in accordance with claim 1, wherein means are also provided for vertical adjustment of the cutter bar relative to the cutting frame, and the means flexibly connecting the front end of the auxiliary trough section to the cutter bar including means on the cutter bar for supporting the front end of the auxiliary trough section when the cutter bar is adjusted vertically a presently determined distance above the mine floor.

3. The structure in accordance with claim 1, wherein the means flexibly connecting the front end of the auxiliary trough section to the cutter bar includes a pair of pivot pins at opposite sides of the auxiliary trough section having loose fitting engagement in vertically slotted supports fixed to the rear of the cutter bar.

4. The structure of claim 3, wherein the slotted supports are of such length that the front end of the auxiliary trough section may be supported on the ground with the pivot pins disposed intermediate the ends of the slotted supports when the cutter bar is in position to cut at ground level in a horizontal plane, whereby the pivot pins are afforded relative freedom of up or down readjustment in said slotted supports when the cutter bar is tilted out of its horizontal position.

5. In a mining machine, a main frame, a cutting frame mounted on the forward end of said frame, said cutting frame including a horizontally disposed cutter bar, means affording lateral tilting adjustments of said cutter bar relative to said main frame, a conveyor on said main frame for discharging cuttings from said cutting frame, including a trough section fixed on said main frame rearwardly of said cutter bar, an auxiliary trough section forming a continuation of said first-named trough section having its rear end pivotally connected to said first-named trough section on a transverse axis, and means flexibly connecting the front end of said auxiliary trough section to said cutter bar to maintain the latter in material-receiving relation to said cutter bar in all permissible positions of adjustment thereof, including a pair of pivot pins at opposite sides of the auxiliary trough section having loose fitting engagement in slotted supports fixed to the rear of the cutter bar.

No references cited.